US007088963B2

(12) United States Patent
Riedl et al.

(10) Patent No.: US 7,088,963 B2
(45) Date of Patent: Aug. 8, 2006

(54) ARCHITECTURE FOR CORDLESS TELEPHONES

(75) Inventors: Wilhelm Ernst Riedl, Indianapolis, IN (US); Hung Chi Lai, Indianapolis, IN (US); Kenneth Mills, Fishers, IN (US); Chandra Mohan, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 488 days.

(21) Appl. No.: 10/220,167

(22) PCT Filed: Feb. 28, 2001

(86) PCT No.: PCT/US01/06403

§ 371 (c)(1),
(2), (4) Date: Dec. 19, 2002

(87) PCT Pub. No.: WO01/65708

PCT Pub. Date: Sep. 7, 2001

(65) Prior Publication Data

US 2004/0127170 A1    Jul. 1, 2004

Related U.S. Application Data

(60) Provisional application No. 60/185,585, filed on Feb. 28, 2000.

(51) Int. Cl.
*H04B 1/44* (2006.01)
*H04B 1/40* (2006.01)
*H04J 3/00* (2006.01)

(52) U.S. Cl. .................. 455/78; 455/86; 455/90.2; 455/76; 455/338; 370/278; 370/280

(58) Field of Classification Search .................. 455/78, 455/76, 83, 86, 88, 74.1, 553.1, 90.2, 90.3, 455/118, 323, 334, 338; 370/278, 280, 282, 370/294, 284; 375/219
See application file for complete search history.

(56) References Cited

U.S. PATENT DOCUMENTS

| 5,276,913 | A | * | 1/1994 | Lee et al. .................. 455/76 |
| 5,319,799 | A | * | 6/1994 | Morita .................. 455/78 |
| 5,327,582 | A | * | 7/1994 | Wong .................. 455/76 |
| 5,423,075 | A | * | 6/1995 | Boese et al. .................. 455/86 |
| 5,515,364 | A | | 5/1996 | Fague .................. 370/29 |
| 5,590,412 | A | * | 12/1996 | Sawai et al. .................. 455/82 |
| 5,657,344 | A | * | 8/1997 | Na .................. 375/219 |

(Continued)

FOREIGN PATENT DOCUMENTS

EP    398 688 A2    11/1990

(Continued)

*Primary Examiner*—Duc M. Nguyen
(74) *Attorney, Agent, or Firm*—Joseph J. Laks; Robert B. Levy; Joseph J. Kolodka

(57) ABSTRACT

An analog cordless telephone has a handset and a base. The handset and/or the base of the telephone may include the following components. A phase locked loop (PLL) and a voltage controlled oscillator (VCO), adapted to be shared between a receive path and a transmit path. A first analog gate is adapted to gate a received audio signal on and off, in response to a clock signal. A second analog gate is adapted to gate a transmit audio signal on and off, in response to an inverted version of the clock signal. The transmit audio signal is enabled when the received audio signal is gated off, and the VCO is further adapted to be modulated by the enabled transmit audio signal to output a modulated RF signal.

16 Claims, 1 Drawing Sheet

U.S. PATENT DOCUMENTS

| | | |
|---|---|---|
| 5,752,195 A | 5/1998 | Tsuji et al. |
| 6,026,114 A * | 2/2000 | Koh ............................ 375/130 |
| 6,389,266 B1 * | 5/2002 | Nilsson ........................ 455/76 |
| 6,411,660 B1 * | 6/2002 | Oh .............................. 375/327 |
| 2003/0119455 A1 * | 6/2003 | Nakamura et al. ............ 455/78 |

FOREIGN PATENT DOCUMENTS

| | | |
|---|---|---|
| EP | 521 238 A1 | 1/1993 |
| GB | 2188212 A | 9/1987 |
| WO | 98/37639 | 8/1998 |

* cited by examiner

ARCHITECTURE FOR CORDLESS TELEPHONES

This application claims the benefit under 35 U.S.C. § 365 of International Application PCT/US01/06403, filed Feb. 28, 2001, which claims the benefit of U.S. Provisional Application, Ser. No. 60/185,585 filed Feb. 28, 2000.

BACKGROUND OF THE INVENTION

1. Field of the Invention

The present invention relates generally to cordless telephones and, in particular, to a cordless telephone having a single phase locked loop (PLL) and associated voltage controlled oscillator (VCO) for both the transmitter and receiver paths of the handset unit, and a single PLL and associated VCO for the base unit.

2. Description of Related Art

Conventional 900 MHz or 2.4 GHz analog cordless telephones having a single PLL and VCO for the handset and another single PLL and associated VCO for the base would require phase shifters and cancellation circuits. However, implementing the cancellation circuits would be very difficult and would result in a fairly costly solution.

Accordingly there is a need for an analog cordless telephone having a single PLL and VCO for the handset and another single PLL and associated VCO for the base, but not having cancellation circuits.

SUMMARY OF THE INVENTION

The problems stated above, as well as other related problems of the prior art, are solved by the present invention, an analog cordless telephone. The cordless telephone has a single phase locked loop (PLL) and associated voltage controlled oscillator (VCO) for both the transmitter and receiver paths of the handset unit, and a single PLL and associated VCO for the base unit. However, the cordless telephone does not include any cancellation circuits, as would likely be required by prior art cordless telephone having a single PLL and associated VCO for the handset unit, and a single PLL and associated VCO for the base unit.

According to one aspect of the invention, there is provided an analog cordless telephone having a handset and a base. The handset and/or the base of the telephone may include the following components. A phase locked loop (PLL) and a voltage controlled oscillator (VCO), adapted to be shared between a receive path and a transmit path. A first analog gate is adapted to gate a received audio signal on and off, in response to a clock signal. A second analog gate is adapted to gate a transmit audio signal on and off, in response to an inverted version of the clock signal. The transmit audio signal is enabled when the received audio signal is gated off, and the VCO is further adapted to be modulated by the enabled transmit audio signal to output a modulated RF signal.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
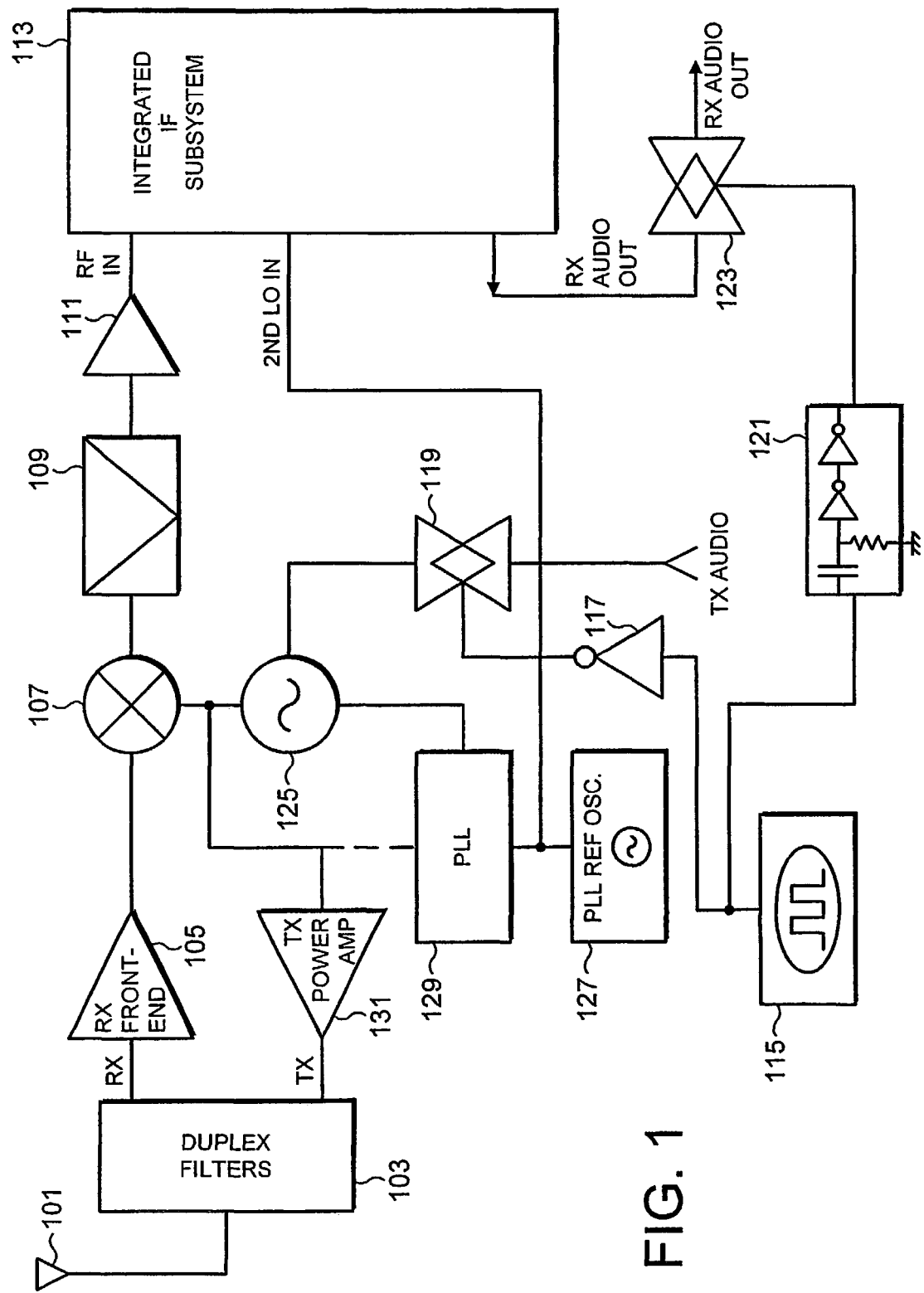
FIG. 1 is a block diagram illustrating a cordless telephone 100, according to an illustrative embodiment of the invention.

The present invention is directed to an analog cordless telephone having only one phase locked loop (PLL) and associated voltage controlled oscillator (VCO) for both the RX and TX paths of the handset, and only a one PLL and associated VCO for the base. As used herein, the terms "Rx" and "Tx" correspond to the receiver and the transmitter, respectively, of either the handset or the base of the analog cordless telephone according to the invention.

It is to be appreciated that the invention advantageously samples the RX and TX signals in such a manner that during part of the time the RX signal is processed and during another part of the time the TX signal is used to modulate the transmitter. The preceding events occur such that the corresponding time periods are not overlapping. Such an approach results in a cost-effective analog cordless telephone which does not require adjustments and which is fairly immune to component tolerances, temperature drift and component aging.

The sampling frequencies for the handset and base units are chosen to be different to achieve an asynchronous system. That is, the sampling clocks in the base and handset are not phase locked to one another. In an illustrative embodiment of the invention, the base unit sampling frequency is about 35 kHz and the handset sampling frequency is about 15 kHz. Of course, other frequencies may be used while maintaining the spirit and scope of the invention.

FIG. 1 is a block diagram illustrating a cordless telephone 100, according to an illustrative embodiment of the invention. The cordless telephone 100 includes: an antenna 101; duplex filters 103; an Rx front-end 105; a first mixer 107; a first intermediate frequency (IF) filter 109; an IF amplifier 111; an integrated IF subsystem (e.g., an integrated circuit such as MC 3361 by MOTOROLA) 113; a first analog gate 123; an radio frequency (RF) network and Schmidt trigger 121; a sampling clock generator 115; a phase locked loop (PLL) reference oscillator 127; a PLL 129; an inverter 117; a second analog gate 119; a voltage controlled oscillator (VCO) 125; and a TX power amplifier 131.

Advantageously, both the receiver and the transmitter share the same PLL 129 and VCO 125. The VCO signal is used to inject the first mixer 107 in the RX chain and to provide the TX signal.

A signal is received by the antenna 101, filtered by the duplex filters 103, amplified by the Rx front-end amplifier 105, and mixed by first mixer 107 to output a signal having a first intermediate frequency (first IF signal). The first IF signal is filtered by the first IF filter 109. It is to be appreciated that the first IF is selected to equal the difference between the TX and desired RX frequencies for each channel.

After being amplified by the IF amplifier 111, the first IF signal is routed to an IF Block (integrated IF subsystem 113) that contains circuitry for conversion to a second intermediate frequency (second IF), a Limiter amplifier chain, and subsequent FM detection. A second LO input ($2^{nd}$ LO IN) is provided from the reference oscillator 127 of the PLL 129. The output of the integrated IF subsystem 113 is the Rx audio out signal.

The RX audio out signal is gated on and off by a first analog gate 123, which is controlled by a clock signal output from the sampling clock generator 115 that has had its duty cycle subsequently altered using the RC network and Schmidt trigger 121. This compensates for the time delays through the IF and keeps the TX audio signal and RX signal separated in time. After sampling the RX audio out signal, the RX audio out signal is routed via some amplification and filtering to the rest of the system (e.g., speaker or telephone line, not shown). It is to be appreciated that the RC network and Schmidt trigger 121 are one example of how time delay compensation for the IF chain and signal enable separation of the received audio signal and the transmit audio signal can be implemented. One of ordinary skill in the related art will contemplate these and various other ways of accomplishing the same, while maintaining the spirit and scope of the invention.

The transmit audio signal is gated on and off by the second analog switch 119, which is controlled by the clock signal provided from the sampling clock generator 115 that has been subsequently inverted by the inverter 117. This is done so that the transmit audio signal is only enabled for the period of time that the receive audio signal is gated off in the receive path above.

The resulting switched audio signal is used to frequency modulate the VCO 125 so as to output a modulated RF signal from the VCO 125. The modulated RF signal is then amplified in the TX amplifier chain by the Tx power amplifier 131 and routed via the duplex filters 103 to the antenna 101.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. An analog cordless telephone having a handset and a base, said telephone comprising: in at least one of the handset and the base, a phase locked loop (PLL) and a voltage controlled oscillator (VCO), adapted to be shared between a receive path and a transmit path; a first analog gate adapted to gate a received audio signal on and off, in response to a clock signal; and a second analog gate adapted to gate a transmit audio signal on and off, in response to an inverted version of the clock signal; wherein the transmit audio signal is enabled when the received audio signal is gated off, and the VCO is further adapted to be modulated by the enabled transmit audio signal to output a modulated RF signal wherein a frequency of the clock signal for the handset is different than a frequency of the clock signal for the base.

2. The analog cordless telephone according to claim 1, further comprising a sampling clock generator adapted to output the clock signal.

3. The analog cordless telephone according to claim 1, further comprising an inverter adapted to input the clock signal and to output the inverted version of the clock signal.

4. The analog cordless telephone according to claim 1, further comprising: a mixer adapted to input the received audio signal and to output an intermediate frequency (IF) signal corresponding thereto; at least one intermediate frequency (IF) filter adapted to filter the IF signal; and a time compensation circuit adapted to alter a duty cycle of the clock signal that is provided to the first analog gate to compensate for time delays through the at least one IF filter with respect to the IF signal.

5. The analog cordless telephone according to claim 1, further comprising a signal enable separation circuit adapted to alter a duty cycle of the clock signal that is provided to the first analog gate to ensure that the transmit audio signal is gated off when the received audio signal is gated on, and to ensure that the transmit audio signal is gated on when the received audio signal is gated off.

6. An analog cordless telephone having a handset and a base, said telephone comprising: in at least one of the handset and the base, a phase locked loop (PLL) and a voltage controlled oscillator (VCO), adapted to be shared between a receive path and a transmit path; a first analog gate adapted to gate a received audio signal on and off; a second analog gate adapted to gate a transmit audio signal on and off; a sampling clock generator adapted to output a clock signal; and an inverter adapted to invert the clock signal to output an inverted clock signal; wherein said first analog gate is controlled by the clock signal, said second analog gate is controlled by the inverted clock signal, the transmit audio signal is enabled when the received audio signal is gated off, and the VCO is further adapted to be modulated by the enabled transmit audio signal to output a modulated RF signal wherein a frequency of the clock signal for the handset is different than a frequency of the clock signal for the base.

7. The analog cordless telephone according to claim 6, further comprising: a mixer adapted to input the received audio signal and to output an intermediate frequency (IF) signal corresponding thereto; at least one intermediate frequency (IF) filter adapted to filter the IF signal; and an RC network and a Schmidt trigger collectively adapted to alter a duty cycle of the clock signal that is provided to the first analog gate to compensate for time delays through the at least one IF filter with respect to the IF signal.

8. The analog cordless telephone according to claim 6, further comprising an RC network and a Schmidt trigger collectively adapted to alter a duty cycle of the clock signal that is provided to the first analog gate to ensure that the transmit audio signal is gated off when the received audio signal is gated on, and to ensure that the transmit audio signal is gated on when the received audio signal is gated off.

9. An analog cordless telephone having a handset and a base, said telephone comprising: in at least one of the handset and the base, a phase locked loop (PLL) and a voltage controlled oscillator (VCO), adapted to be shared between a receive path and a transmit path; a first analog gate adapted to gate a received audio signal on and off, in response to a clock signal; a second analog gate adapted to gate a transmit audio signal on and off, in response to an inverted version of the clock signal; wherein the transmit audio signal is enabled when the received audio signal is gated off, and the VCO is further adapted to be modulated by the enabled transmit audio signal to output a modulated RF signal; and a signal enable separation circuit adapted to alter a duty cycle of the clock signal that is provided to the first analog gate to ensure that the transmit audio signal is gated off when the received audio signal is gated on, and to ensure that the transmit audio signal is gated on when the received audio signal is gated off.

10. The analog cordless telephone according to claim 9, further comprising a sampling clock generator adapted to output the clock signal.

11. The analog cordless telephone according to claim 9, further comprising an inverter adapted to input the clock signal and to output the inverted version of the clock signal.

12. The analog cordless telephone according to claim 9, wherein a frequency of the clock signal for the handset is different than a frequency of the clock signal for the base.

13. An analog cordless telephone having a handset and a base, said telephone comprising: in at least one of the handset and the base, a phase locked loop (PLL) and a voltage controlled oscillator (VCO), adapted to be shared between a receive path and a transmit path; a first analog gate adapted to gate a received audio signal on and off, in response to a clock signal; a second analog gate adapted to gate a transmit audio signal on and off, in response to an inverted version of the clock signal; wherein the transmit audio signal is enabled when the received audio signal is gated off, and the VCO is further adapted to be modulated by the enabled transmit audio signal to output a modulated RF signal; a mixer adapted to input the received audio signal and to output an intermediate frequency (IF) signal corresponding thereto; at least one intermediate frequency (IF) filter adapted to filter the IF signal; and a time compensation circuit adapted to alter a duty cycle of the clock signal that is provided to the first analog gate to compensate for time delays through the at least one IF filter with respect to the IF signal.

14. The analog cordless telephone according to claim 13, further comprising a sampling clock generator adapted to output the clock signal.

15. The analog cordless telephone according to claim 13, further comprising an inverter adapted to input the clock signal and to output the inverted version of the clock signal.

16. The analog cordless telephone according to claim 13, wherein a frequency of the clock signal for the handset is different than a frequency of the clock signal for the base.

* * * * *